United States Patent
Singh et al.

(10) Patent No.: US 10,992,397 B2
(45) Date of Patent: Apr. 27, 2021

(54) SYSTEMS AND METHODS FOR MOBILE NETWORK INTERFERENCE ANALYSIS

(71) Applicant: VMware, Inc., Palo Alto, CA (US)

(72) Inventors: Sarabjot Singh, Palo Alto, CA (US); Adnan Raja, Palo Alto, CA (US); Srikanth Hariharan, Sunnyvale, CA (US); Aditya Gudipati, Los Angeles, CA (US); Alexandros Anemogiannis, Palo Alto, CA (US); Manu Sharma, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/841,855

(22) Filed: Apr. 7, 2020

(65) Prior Publication Data
US 2020/0235834 A1     Jul. 23, 2020

Related U.S. Application Data

(63) Continuation of application No. 16/441,518, filed on Jun. 14, 2019, now Pat. No. 10,623,120.

(60) Provisional application No. 62/805,688, filed on Feb. 14, 2019, provisional application No. 62/685,803, filed on Jun. 15, 2018.

(51) Int. Cl.
| | |
|---|---|
| *H04W 4/00* | (2018.01) |
| *H04B 17/345* | (2015.01) |
| *H04B 17/27* | (2015.01) |
| *H04W 12/00* | (2021.01) |
| *H04B 17/382* | (2015.01) |
| *H04B 17/391* | (2015.01) |

(52) U.S. Cl.
CPC .......... *H04B 17/345* (2015.01); *H04B 17/27* (2015.01); *H04B 17/382* (2015.01); *H04B 17/391* (2015.01); *H04W 12/007* (2019.01)

(58) Field of Classification Search
CPC ......................... H04W 28/0236; H04W 40/16
See application file for complete search history.

(56) References Cited

U.S. PATENT DOCUMENTS

| | | | |
|---|---|---|---|
| 2014/0112164 A1 | 4/2014 | Wigren | |
| 2014/0269374 A1 | 9/2014 | Abdelmonem | |
| 2014/0321351 A1 | 10/2014 | Kim | |
| 2016/0050690 A1 | 2/2016 | Yun | |
| 2016/0301434 A1* | 10/2016 | Botchway | H04W 52/24 |
| 2017/0064564 A1 | 3/2017 | Yun | |
| 2017/0238201 A1 | 8/2017 | Gormley | |
| 2018/0070362 A1 | 3/2018 | Ryan | |
| 2018/0323815 A1* | 11/2018 | Beadles | H04B 1/123 |
| 2019/0253861 A1 | 8/2019 | Horelik | |

FOREIGN PATENT DOCUMENTS

WO    WO-2007138651 A1 *   12/2007   ......... H04W 52/04

OTHER PUBLICATIONS

"Telecom Planning, Optimization, and Management,", https://www.thinkrf.com/solutions/telecom-planning-optimization-management/.
Yer, Anand Padmanabha, "Automating Diagnosis of Cellular Radio Access Network Problems", Paper Session II: Can you Hear Me Now?, MobiCom '17, Oct. 2017, Snowbird, UT, USA.

* cited by examiner

*Primary Examiner* — Omoniyi Obayanju
(74) *Attorney, Agent, or Firm* — Clayon, McKay & Bailey, PC

(57) ABSTRACT

Systems and methods for providing information describing mobile network interference experienced by a mobile network.

26 Claims, 11 Drawing Sheets

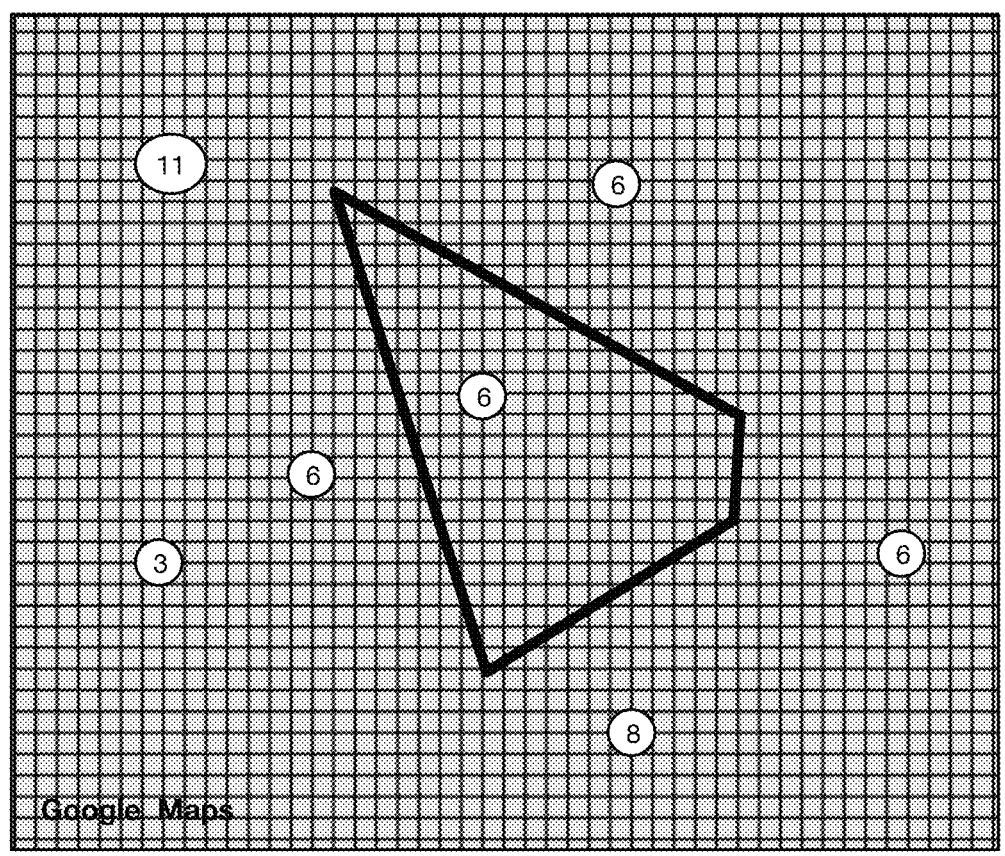
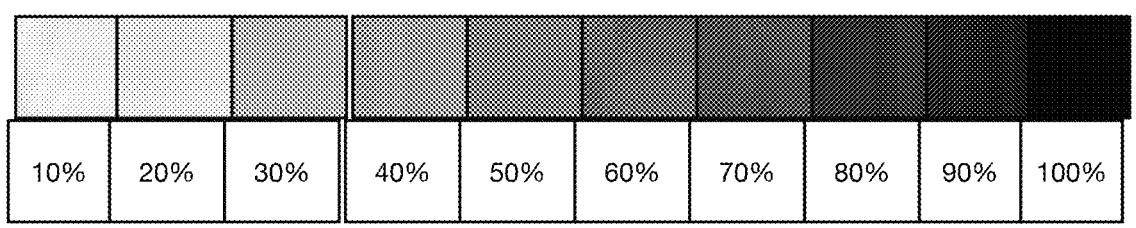
FIGURE 3

FIGURE 4

REQUEST (provided by operator device to interference
analysis system 105

GET_InterferenceAnalysis

Parameters:

[tStart,tEnd]: start and end times defining a time
    window; return the interferers detected in this
    time window

[qoEImpactThresh]: Return the interferers whose QoE
    impact above is this threshold

[cellList]: Return the interferers which affected
    these cells

RESPONSE (provided by interference analysis system 105 to
the operator device)

GET_InterferenceAnalysis

Parameters:

[Interferer List]
     o  Each element of this list contains the
        attributes of the corresponding interferer
          [tStart,tEnd]
- Timewindow in which the interferer was present
          [qoEImpact]
- QoE impact of this interferer
          [affectedCellList]
- Cells affected by this interferer
          [locationMap]:
- A list of coordinates (lat,lon) along with a probability of the interferer being located there

*FIGURE 10*

SYSTEMS AND METHODS FOR MOBILE NETWORK INTERFERENCE ANALYSIS

CROSS-REFERENCE TO RELATED APPLICATIONS

This application is a continuation of U.S. patent application Ser. No. 16/441,518, entitled "SYSTEMS AND METHODS FOR MOBILE NETWORK INTERFERENCE ANALYSIS" and filed Jun. 14, 2019, which claims priority to U.S. Provisional Application No. 62/685,803, filed Jun. 15, 2018, and U.S. Provisional Application No. 62/805,688, filed Feb. 14, 2019, all of which are incorporated herein in their entireties.

TECHNICAL FIELD

One or more of the inventions described herein generally relate to the mobile networking field, and more specifically to new and useful systems and methods for providing analysis of mobile network interference in the mobile networking field.

BACKGROUND

Interference in the licensed wireless spectrum owned by commercial telecommunications service providers can often lead to significant performance degradation of the services offered. Such interference is often from external sources, such as unauthorized jammers, out-of-band emissions from devices, sources such as passive intermodulation (PIM), or inter-cell interference due to poor radio frequency (RF) planning.

Conventional techniques for detecting, locating, and neutralizing interference from external sources are often expensive, time-consuming, inefficient, and often ineffective.

Thus, there is a need in the mobile networking field to create new and useful systems and methods for detecting, locating, and neutralizing interference in a mobile network. The inventions described herein provide such new and useful methods.

BRIEF DESCRIPTION OF THE FIGURES

FIG. 3 illustrates an example of a spatial heatmap in accordance with one or more embodiments.

FIG. 4 illustrates an example of a user interface for providing interference analysis output in accordance with one or more embodiments.

FIG. 10 illustrates an API definition in accordance with one or more embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System

Figure 1:
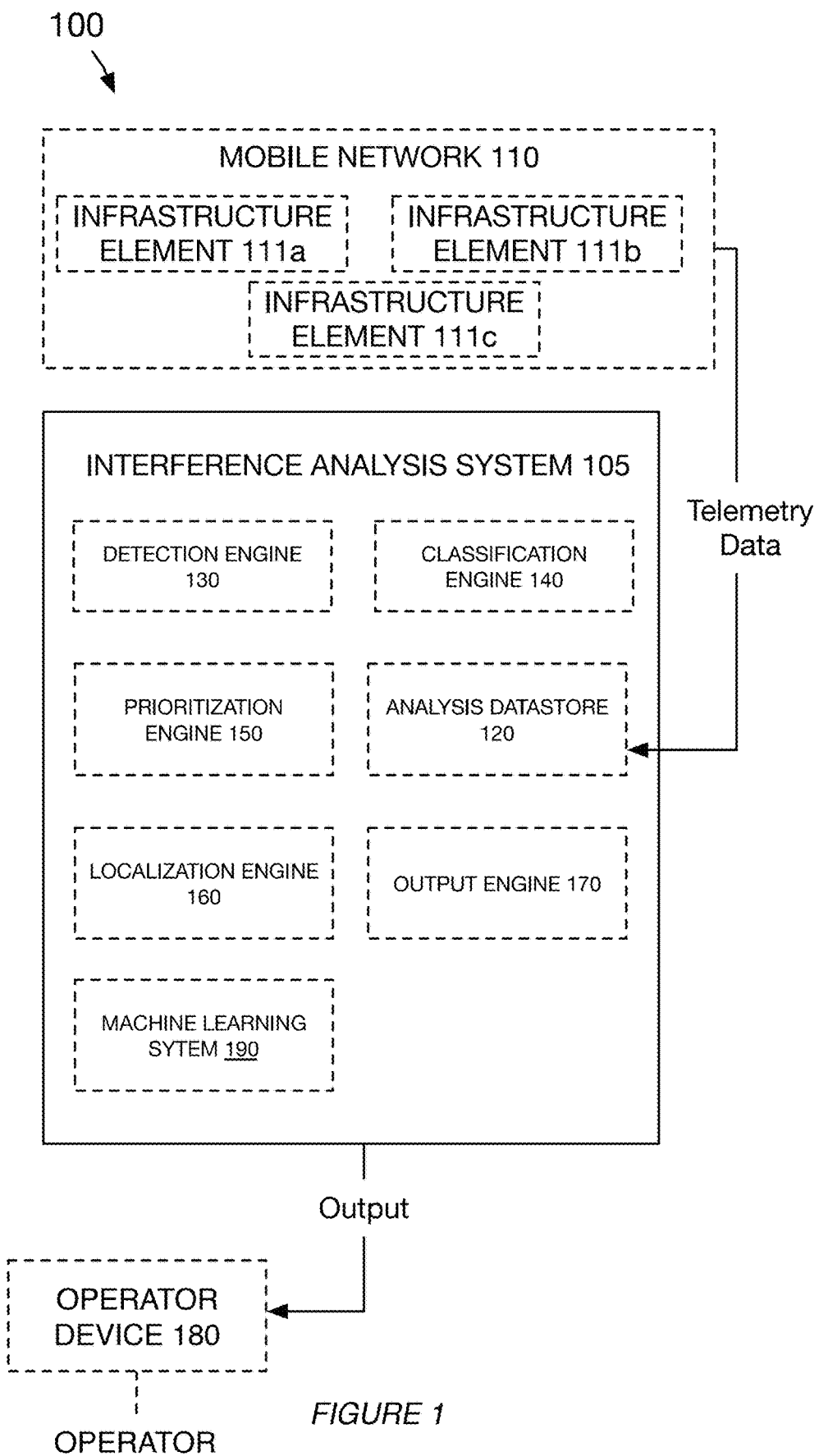
FIG. 1 illustrates a schematic representation of a system in accordance with one or more embodiments.
Figure 7:
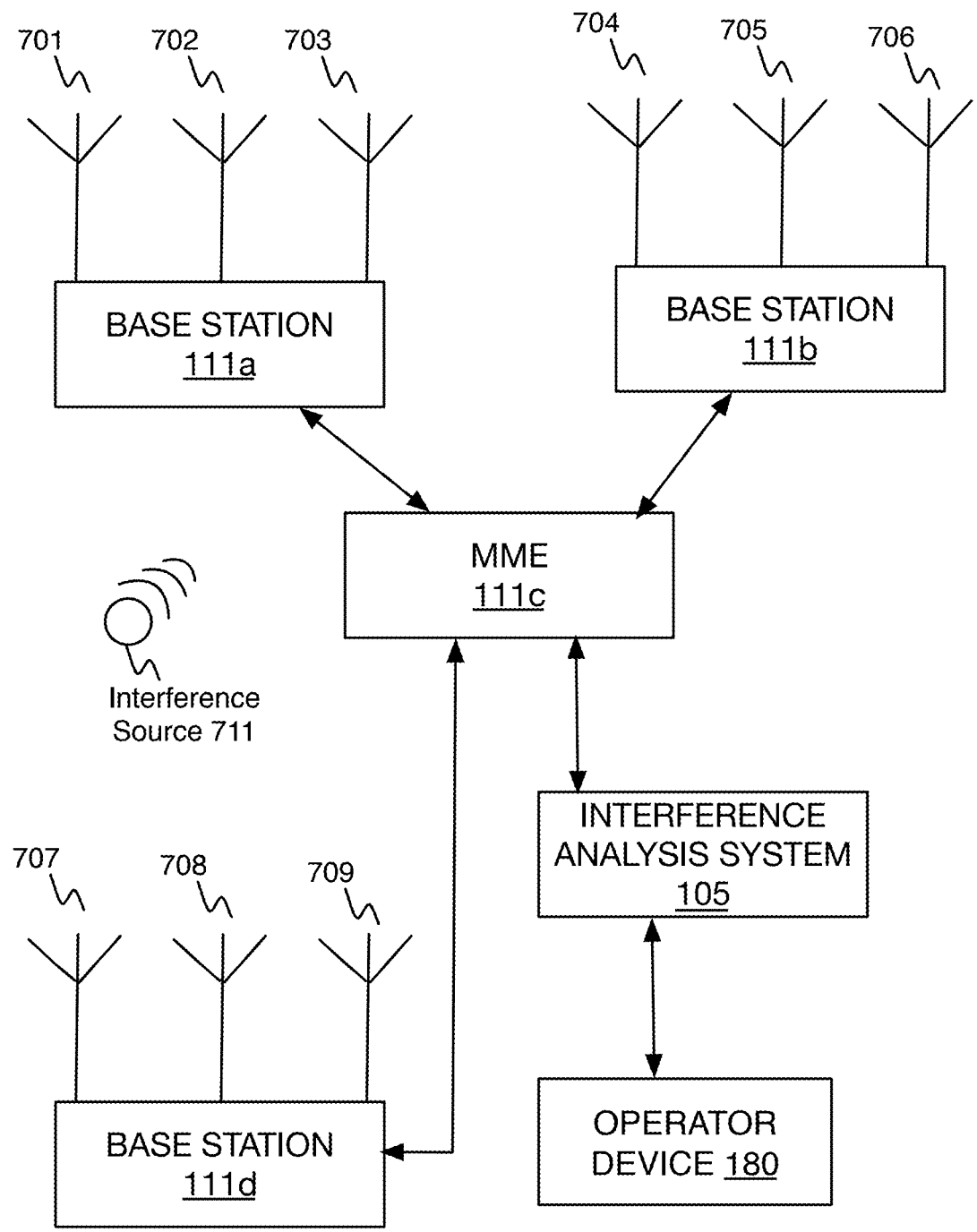
FIG. 7 illustrates a schematic representation of a system in accordance with one or more embodiments.
Figure 8:
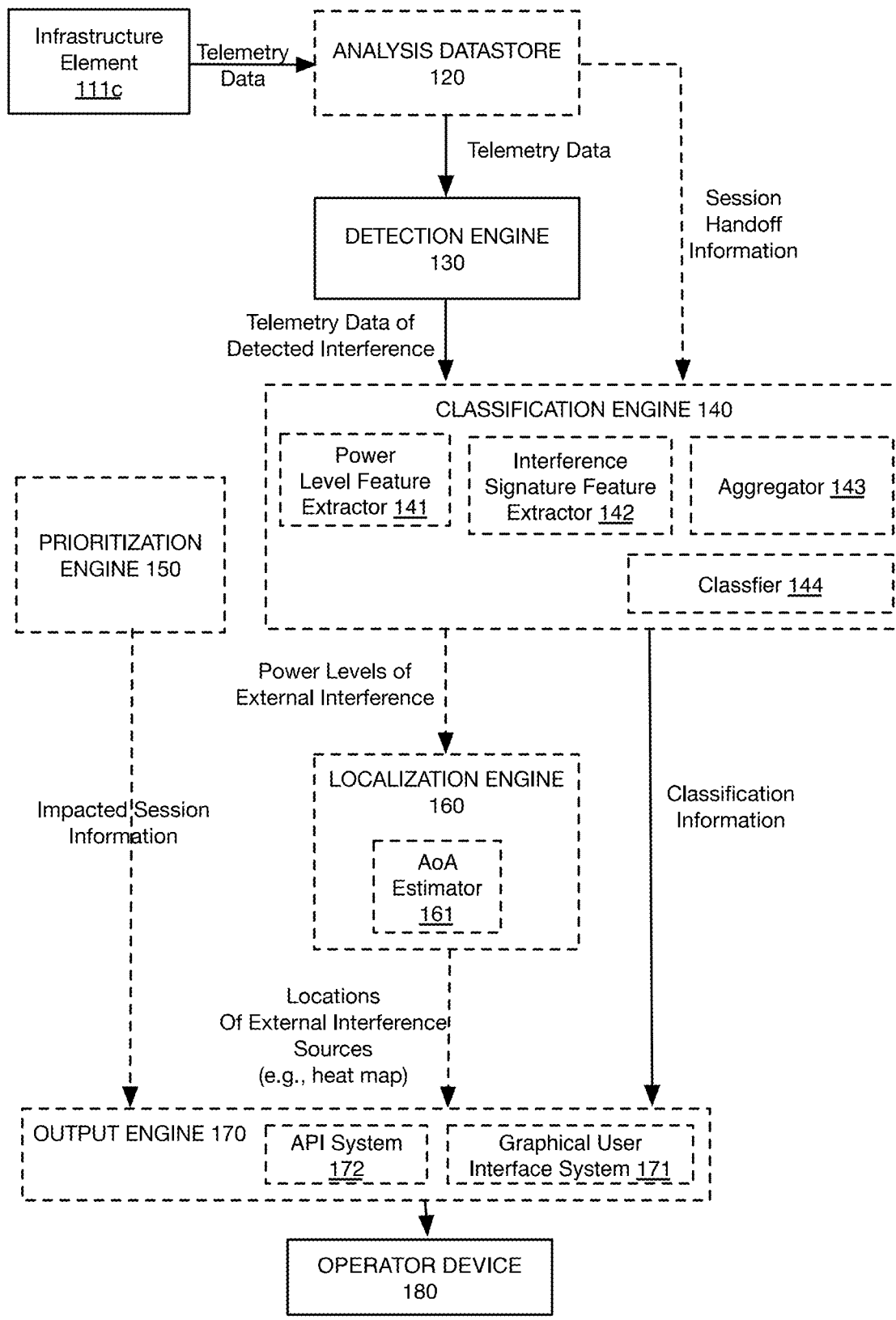
FIG. 8 illustrates a schematic representation of a system in accordance with one or more embodiments.

As shown in FIGS. 1 and 8, a system 100 functions to provide analysis of mobile network interference. The system 100 includes an interference analysis system 105. The system 100 optionally includes at least one of a mobile network 110, and an operator device 180. The mobile network no can include one or more infrastructure elements (e.g., 111a, 111b, 111c), such as for example, base stations, an MME (Mobility Management Entity), and the like. In some implementations, at least one of the infrastructure elements is a base station including at least one receive antenna (e.g., 701-709 shown in FIG. 7). In some implementations, at least one of the infrastructure elements is an eNodeB. In some implementations, at least one of the infrastructure elements is an MME.

The interference analysis system 105 functions to generate the analysis, which can include one or more of generated interference information, mobile network control information, mobile network configuration information, and a graphical user interface. The interference analysis system 105 can include at least one of an analysis datastore 120, a detection engine 130, a classification engine 140, a prioritization engine 150, a localization engine 160, an output engine 170, and a machine learning system 190. In some variations, the interference analysis system 105 is a single-tenant platform. In some variations, the interference analysis system 105 is a multi-tenant platform, wherein tenants can include a plurality of mobile network operators.

In some implementations, the interference analysis system 105 is an on-premises system that is included within a same computing environment as the mobile network no (e.g., behind a firewall of the mobile network 110). In some implementations, the interference analysis system 105 is an external system that is communicatively coupled to at least one infrastructure element (e.g., 111c) of the mobile network no via a network (e.g., a public network, such as the Internet, a private network). In some implementations, the interference analysis system 105 is an external system (e.g., a multi-tenant platform) that is communicatively coupled to at least one infrastructure element (e.g., 111c) of the mobile network no via a network (e.g., a public network, such as the Internet, a private network), as well as an infrastructure element of a different mobile network.

In some variations, the interference analysis system 105 may be implemented by a mobile networking service, network monitoring and/or control service, network security service, internet service provider, or any other network service. In a preferred embodiment, one or more aspects of the system may be enabled by a web-based software platform (e.g., the interference analysis platform) operable on a web server or distributed computing system.

The system 100 functions to detect radio interference affecting a mobile network (e.g., 110) (e.g., within a geographical area of the mobile network maintained by an operator). Detected interference can include interference generated by an interference source external to the mobile network (e.g., 711 shown in FIG. 7) and interference generated by an infrastructure element of the mobile network. The system 110 optionally performs one or more of classifying detected interference (e.g., as interference generated by an external source), determining one or more root causes for detected interference, determining a prioritization of detected interference with respect to service degradation of a subscriber, and determining interference location probabilities within an area of the mobile network. The system 100 optionally provides an output of interference analysis to the operator. Interference analysis can include one or more of generated interference information, mobile network control information, mobile network configuration information, and a graphical user interface. Examples of the output include a user interface dashboard with analysis information, as well as a spatial heatmap of the area of the mobile network, with heatmap colors corresponding to probabilities of interference source locations within the area. The system 100 optionally recommends one or more corrective actions for mitigating the interference as part of the provided analysis output.

The mobile network 110 can include one or more of a cellular network, wireless network, wireless spectrum network, or any other network maintained by a network operator. In some variations, the network operator is a streaming media provider, internet service provider, vendor, or other entity associated with a network. In some variations, the mobile network sends telemetry data to the interference analysis system 105. In some implementations, an infrastructure element (e.g., 111c shown in FIG. 8) of the mobile network (e.g., an MME) provides the telemetry data to the interference analysis system 105. In some implementations, an analysis datastore (e.g., 120 shown in FIG. 8) receives the telemetry data.

Telemetry data can include any data relating to the network and telemetry.

Telemetry data can include, but is not limited to, at least one of: a timestamp of when an event occurred in the network; a threshold relating to at least one of data bandwidth, download speed, call failure, or other aspect of the network that has been exceeded, and at what time); the frequency of calls being dropped for VoiceIP data; the location of cell towers within the mobile network; customer complaints received, in which areas, and at what frequency; and any other data relating to the network and telemetry. In some variations, the interference analysis system 105 monitors the mobile network (e.g., 110) and collects telemetry data. In some variations, the telemetry data is stored within an analysis datastore 120 within the interference analysis system 105.

In some variations, the telemetry data includes UE polling responses (as described herein). In some variations, the telemetry data includes at least one of a performance KPI and a network KPI.

In some variations, the telemetry data includes network trace data generated by at least one infrastructure element of the mobile network. In some variations, the telemetry data includes network trace data generated by each base station of the mobile network.

In some variations, the telemetry data includes session handoff information for at least one base station of the mobile network. In some implementations, the session handoff information for a base station identifies at least one other base station to which the base station hands of a mobile communication session.

Figure 9:
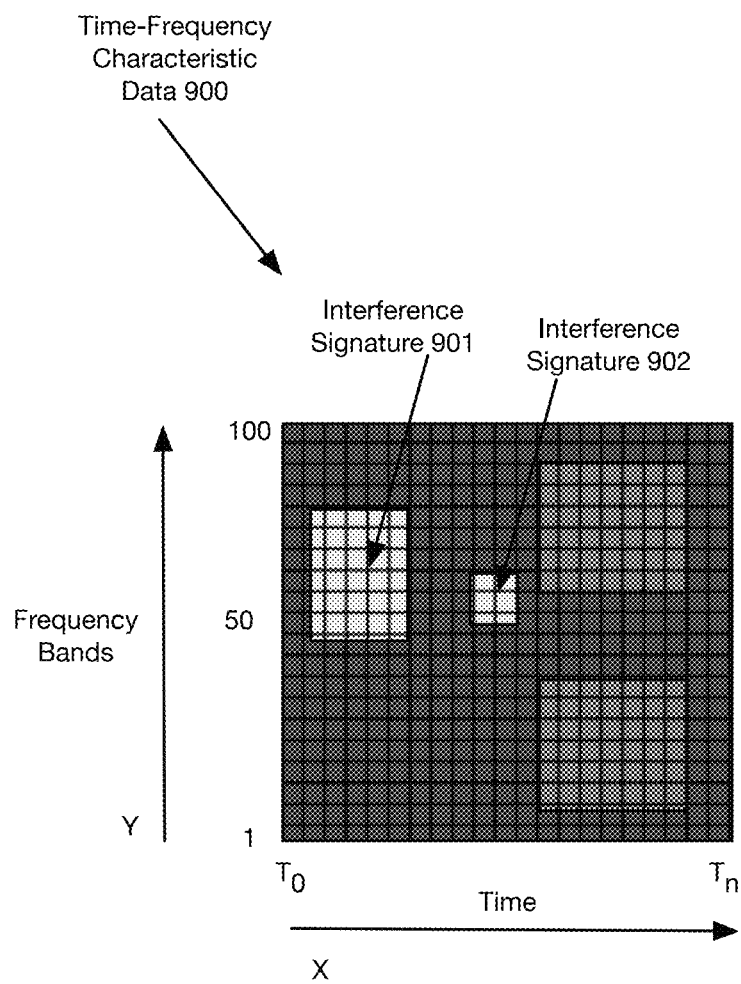
FIG. 9 illustrates a schematic representation of telemetry data in accordance with one or more embodiments.
Figure 11:
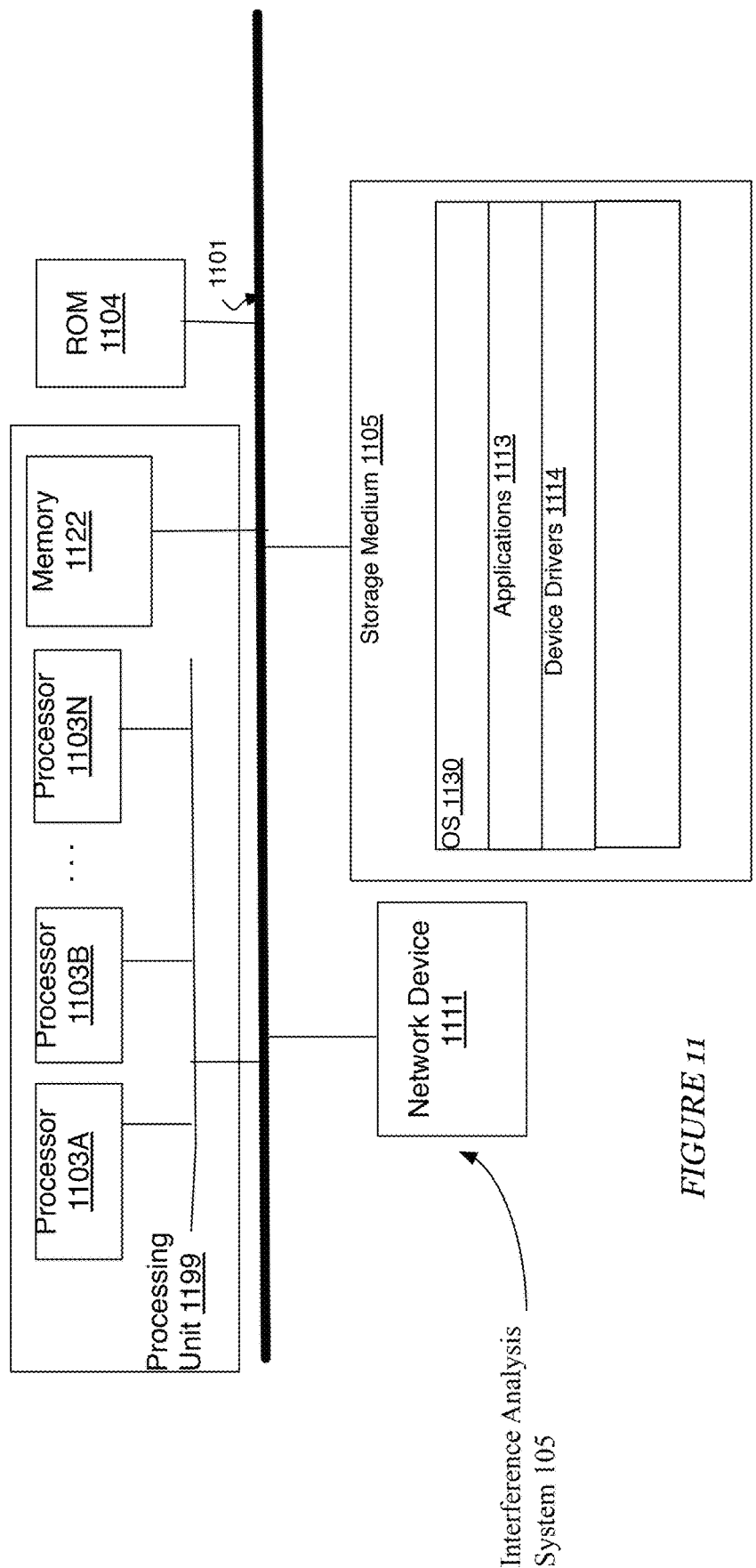
FIG. 11 illustrates system architecture in accordance with one or more embodiments.

In some variations, the telemetry data includes time-frequency characteristic data for at least one base station receive antenna (e.g., 701-709). In some variations, the telemetry data identifies at least one of a base station and a receive antenna for each time-frequency characteristic data. In some variations, the telemetry data identifies a geographical location (e.g., longitude and latitude) for time-frequency characteristic data. In some variations, the telemetry data includes antenna information for at least one receive antenna, such that the antenna information can be correlated with corresponding time-frequency characteristic data for the antenna. In some variations, antenna information includes at least one of radio frequency propagation characteristics, relative location of the antenna with respect to other antennas of the network, antenna height, antenna orientation, antenna type, base station associated with the antenna, and the like. FIG. 9 shows exemplary time-frequency characteristic data that identifies intensity (power) in decibels of a radio signal received by a receiving antenna (e.g., 701-709 shown in FIG. 7) for each of a plurality of frequency bands (e.g., 1-100) during an identified time period starting at $T_0$ and ending at $T_n$. As shown in FIG. 9, the color at a given point in the grid shown in FIG. 9 indicates the intensity (in decibels) of radio signal measured at time X and frequency band Y. Time-frequency characteristic data included in the received telemetry data can include time-frequency characteristic data that represents a combined radio signal that includes the following components: communication signal, noise, interference. Time-frequency characteristic data included in the received telemetry data can also include time-frequency characteristic data that represents a combined radio signal that includes the following components: noise, interference (with the communication signal component being removed). Time-frequency characteristic data included in the received telemetry data include one or more portions (interference signatures) that correspond to radio interference. As shown in FIG. 9, the time-frequency characteristic data includes interference signatures 901 and 902.

The interference analysis datastore 120 can include one or more databases in which telemetry data received from the mobile network (e.g., from an infrastructure element) can be stored. In one implementation, the interference analysis datastore 120 includes a mobile network databank that stores mobile network data during an analysis of an interference issue within the network.

The machine learning system 190 functions to perform at least one of: generating labeled training data; and training at least one machine learning model. The machine learning system 190 can include one or more of a local machine learning system (e.g., implemented in Python, R, etc.), a cloud-based machine learning client (e.g., an application communicatively coupled to a cloud-based machine learning system such as, for example, Microsoft Azure Machine Learning Service, and the like), or any other suitable type of machine learning system. In some implementations, the machine learning system functions to train and/or generate at least one component of at least one of the detection engine 130, the classification engine 140, the prioritization engine 150, and the localization engine 160. In some implementations, at least one of the machine learning system 190, the detection engine 130, the classification engine 140, the prioritization engine 150, and the localization engine 160 includes a component (e.g., a module, a model, etc.) that functions to perform one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style.

In some implementations, at least one of the machine learning system 190, the detection engine 130, the classification engine 140, the prioritization engine 150, and the localization engine 160 implements any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. At least one processing portion of the system 105 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 105.

The detection engine 130 functions to detect interference by using at least the telemetry data received by the interference analysis system 105.

The detection engine 130 can implement one or more detection algorithms that function to detect interference by analyzing correlations between pieces or sets of telemetry data. The detection engine 130 can include one or more machine learning components (as described herein) (e.g., a trained machine learning model, a reinforcement learning system, etc.) that function to detect interference by processing at least a subset of accessed telemetry data of the mobile network 110.

In some variations the, detection engine 130 functions to access telemetry data (e.g., from the datastore 120, the network no) for each of a plurality of base station receive antennas (e.g., 701-109), and detect interference at each antenna based on the respective telemetry data. In some variations, the telemetry data of a receive antenna includes time-frequency characteristic data (e.g., as shown in FIG. 9). As shown in FIG. 9, each base station can include multiple antennas, and in some variations, the detection engine 130 functions to detect interference at each antenna of each base station. In some implementations, the detection engine 130 detects interference at an antenna by using time-frequency characteristic data of the antenna. In some implementations, the detection engine 130 detects interference at an antenna by using time-frequency characteristic data of the antenna and time-frequency characteristic data of other antennas (e.g., other antennas of the same base station, other antennas of different base stations). In some implementations, the detection engine 130 includes at least one model trained to detect interference from a single set of time-frequency characteristic data (e.g., power level information at several frequency bands across a continuous time period) (e.g., 900 shown in FIG. 9).

In some variations, the system 100 identifies patterns in one base station (cell) of a mobile network, while in others, the system 100 identifies patterns from multiple neighboring base stations (cells) and can infer one or more interference signatures (e.g., 901, 902) accordingly. In some variations, the system 100 identifies the interference power and ambient power across multiple neighboring base stations (cells) over which the interference is detected. In some variations, similar detected interference signatures are clustered together. In some variations, such similar interference signatures are determined to be coming from the same source.

In some variations, the detection engine 130 functions to provide the classification engine 140 with information identifying at least one set of time-frequency characteristic data (e.g., 900) (e.g., time-frequency data for a single receive antenna across a continuous time period) that corresponds with detected interference (e.g., the data corresponds to the same time period and/or location of the interference detected by the detection engine 130).

In some variations, the classification engine 140 functions to classify interference detected by the detection engine 130. In some variations, the classification engine 140 functions to classify each detected instance of interference by using time-frequency characteristics of the detected instance, as identified by the telemetry data. In some variations, the classification engine 140 functions to classify each detected instance of interference by using session handoff information of at least one base station (e.g., as indicated by base station network trace data, etc.), as identified by the telemetry data. The classification engine 140 can include one or more machine learning components (as described herein) (e.g., a trained machine learning model, a reinforcement learning system, etc.) that function to classify interference by processing at least a subset of accessed telemetry data of the mobile network 110. Alternatively, or additionally, the classification engine 140 can implement one or more detection algorithms that function to classify interference by processing at least a subset of accessed telemetry data of the mobile network no.

In some variations, the classification engine 140 includes at least one of a power level feature extractor 141, an interference signature feature extractor 142, an aggregator 143, and a classifier 144.

In some variations, the classification engine 140 functions to access at least one set of time-frequency characteristic data (e.g., 900) identified by the detection engine 130 as corresponding to an instance of detected interference, extract at least one interference signature (e.g., 901, 902) from the time-frequency characteristic data by using the interference signature feature extractor 142, and generate classification information for at least one extracted interference signature by using the classifier 144. In some implementations, the interference signature feature extractor 142 includes at least one machine learning component (as described herein) trained to extract at least one type of interference signature (e.g., 901, 902). In some implementations, the classifier 144 includes at least one machine learning component (as described herein) trained to classify at least one type of extracted interference signature (e.g., 901, 902).

In some variations, the classifier 144 functions to classify an extracted interference signature (e.g., 901, 902) for a receive antenna by using telemetry data of related receive antennas. In some implementations, the classifier 144 uses an output of the aggregator 143 to identify telemetry data of related receive antennas.

In some variations, the aggregator 143 functions to identify related receive antennas of the mobile network no by the accessed telemetry data and provide the telemetry data of the related receive antennas to the classifier 144. In some implementations, the telemetry data includes information identifying related receive antennas (e.g., antennas of the same base station, antennas of nearby base stations, etc.). In some implementations, the aggregator 143 functions to access session handoff information (e.g., included in the telemetry data) and identify related receive antennas by using the session handoff information. For example, session handoff information for a base station indicates each recipient base station to which the base station hands off communication sessions (between the base station and a UE). In some implementations, the aggregator 143 aggregates telemetry data for related base stations identified by the session handoff information (e.g., base stations that have performed handoffs amongst themselves).

In some variations, the classifier 144 functions to classify an extracted interference signature of a receive antenna of a first base station by determining if the interference signature of the first base station is present in telemetry data of other related base stations (as identified by the aggregator 143). In some implementations, the classifier functions to generate classification information identifying the extracted interference signature as a signature of external interference if the extracted interference signature is also extracted from telemetry data of related base stations at a time corresponding to a time at which the interference signature is detected at the first base station. For example, if an interference signature is extracted at only one base station of a group of related (e.g., nearby) base stations, then the classifier 144 determines that the interference source is internal with respect to the base station. However, if the interference signature is extracted at another base station of the group of related (e.g., nearby) base stations, then the classifier 144 determines that the interference source is external with respect to the base station (e.g., caused by a jammer or other device that is not an infrastructure element of the mobile network 110).

In some variations, classification performed by the classification engine 140 can include root cause classification. In some variations, the classification engine 140 analyzes time, frequency, and/or spatial characteristics of the interference signatures to identify what the root cause is. In some variations, the classification engine 140 calculates a measurement for a particular time and frequency across a given space for each interference signature. In some variations, the classification engine 140 correlates and/or aggregates the results of these measurements and identifies common patterns in them, and then uses the common patterns to determine a root cause. In some variations, multiple interference metrics within the network are used for determining a root cause. In some variations, aggregation of interference signatures to identify patterns results in an increase in classification accuracy and performance. In some variations, the classification engine 140 combines data across base stations (cells). In some variations, based on the correlated signatures, if a same interference signature is detected from telemetry data of multiple infrastructure elements (e.g., base stations, cells, etc.), then the classification engine 140 determines that the interference is external (e.g., generated by an external jammer) and is not caused by an infrastructure element of the mobile network.

In some variations, the classification system 140 identifies whether a source of detected interference is an in-network source. In some variations, the classification system 140 performs this identification based on user equipment (UEs), or user devices, associated with other base stations (cells) in the network (e.g., inter-cell interference), as well as the time-frequency signature of the interference. In some variations, the time-frequency signature of detected interference may correspond to a specific hopping pattern and/or a physical resource block (PRB) allocation policy of the scheduler (and such interference can be classified as internal interference, e.g., caused by an infrastructure element of the mobile network). In some variations, such an interference source can additionally or alternatively be determined based on correlation of the time-frequency signature of the interference with other telemetry data, such as the load and/or PRB usage of neighboring cells.

In some variations, the classification engine 140 functions to enable a polling mechanism for improved detection, collection, and/or classification accuracy. In some variations, upon detecting interference in a certain geographical area, a user device or group of user devices in the area may be "polled" by the mobile network no to report further measurements (radio information) related to their experienced interference levels, e.g., Radio Signal Reference Quality (RSRQ) as well as their location information. In some implementations, in addition to using telemetry data from cell towers (base stations) and other infrastructure elements within the mobile network, one of the interference analysis system 105 and an element of the mobile network no prompts, requests, or commands one of more users, operators, or devices included in (or communicatively coupled to) the mobile network to collect data and/or report measurements relating to the mobile network. In some variations, this includes "polling" or pinging user devices (UEs) and requesting the devices to report data and responses back to the mobile network and/or interference analysis platform. The data or responses relate to how users or devices are experiencing interference levels. In various embodiments, this can improve the collected data set upon which interference signatures are extracted, classification of interference problems is performed, and more. In some variations, the polling mechanisms requests one or more user devices (UEs) to report back the interference they're receiving in the mobile network. In some variations, this is a firmware-level response from the device and does not involve human input or attention.

In some implementations, the system 100 can perform one or more polling mechanisms or modes. In some variations, one or both of two different polling mechanisms may be performed by the system 100. In some implementations, polling is performed by an infrastructure element of the mobile network, which provides polling responses to the interference analysis system 105. In some implementations, polling is performed by the interference analysis system 105. In a first variation, polling is performed by the system 100 leveraging an already existing signal within the device. A radio resource control layer (RRC) allows for periodic measurements, but is not always configured to report these measurements, or report the measurements periodically. In this variation, the report configuration for the selected user equipment can be changed (e.g., permanently, selectively, upon satisfaction of a polling condition, such as a network performance metric value falling below a predetermined threshold or receipt of a polling request) to report the RSRQ or other information. In some implementations, an infrastructure element of the mobile network 110 changes the report configuration to report the RSRQ information at a specified time interval. The system 100 thus operates to have user equipment (UEs) or user devices to report interference levels more periodically. In some variations, system 100 leverages an existing Application Program Interface (API) to configure in such a way so as to increase the periodic frequency of measurements, and thus exposing more consistent sources of information.

In a second variation, the polling can include application layer polling. In application layer polling, the polling can be performed via a carrier setting rather than an existing or standardized API. In some variations, a user device may report radio layer diagnostic information, such as Received Signal Strength Indication (RSSI) or RSRQ, along with GPS location information in the poll response. In some variations, a new API is utilized at the RRC layer that asks user devices to report interference levels as well as a GPS location if one has been determined. In some variations, these measurements are standardized, but an existing API doesn't send them as reports externally, and thus a new API is utilized that handles this functionality and sends reports and/or GPS information. In some variations, an infrastructure element of the mobile network configures the user device to report through existing diagnostic messages that UEs send to the mobile network.

Figure 2:
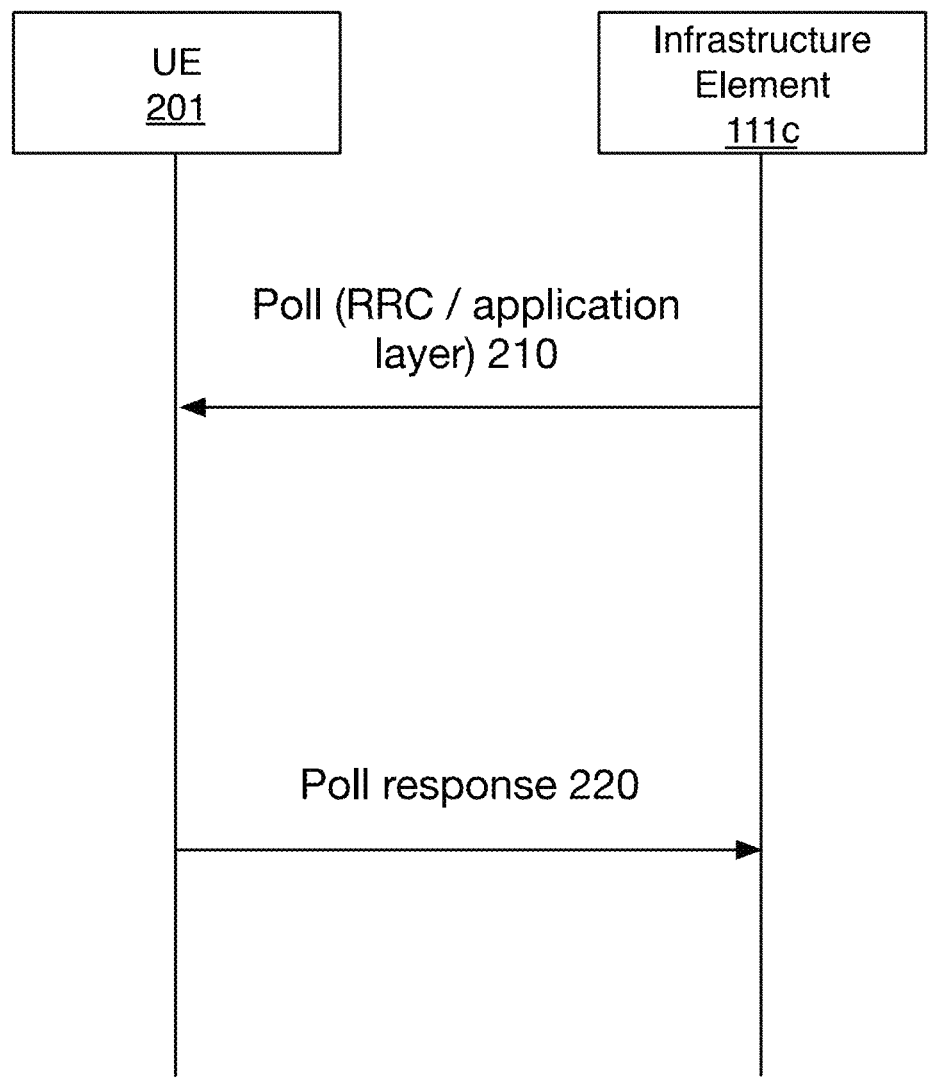
FIG. 2 illustrates an example of a polling mechanism for improved interference analysis in accordance with one or more embodiments.

FIG. 2 illustrates an example of a polling mechanism for improved interference analysis in accordance with one or more embodiments of the present application. An infrastructure element (e.g., 111c) functions to send a request for experienced interference information (radio information) and/or GPS location in the form of a Poll 210 to a UE (User Equipment) (or user device) 201 at the RRC or application layer. The infrastructure element 111c then receives a poll response 220 from the UE at the RRC or application layer. In some variations, the poll response 220 includes the radio information.

Returning to FIG. 1, the prioritization engine 150 functions to determine a prioritization of detected interference with respect to service degradation of subscribers. In some variations, determining the prioritization includes measuring the impact of detected interference on service-level metrics that are important to the operator (of the mobile network) or one or more user devices in the area with respect to service degradation of subscribers, and then prioritizing the interference issues that are occurring in the area based on these metrics. In some variations, the service-level metrics are Key Performance Indicators (KPIs) that an operator designates are important for user service in the operator's network, such as downlink throughput, voice quality, accessibility (i.e., access to the network), and retainability (rate of dropped calls), rate of calls being muted or abruptly handled, etc. In some variations, the operator sends or generates an operator policy that provides information to the interference analysis system (e.g., 105) about service-level metrics or KPIs that the operator has designated or important or critical. In some variations, the operator policy includes an ordered list of such metrics or KPIs. In some variations, the interference analysis system (e.g., 105) analyzes received or collected telemetry data and generates a list of important KPIs for the operator based on the data. In some variations, the prioritization of the detected interference includes an ordered list of identifiers for each detected instance of interference (and optional information identifying one or more root causes for interference) that are occurring in a geographic area, ordered such that higher priority issues will improve the KPIs or metrics when resolved more than lower priority issues.

In some variations, the prioritization engine 150 functions to perform the following for each detected instance of interference: identify a base station corresponding to the detected instance of interference, determining a number of user sessions at that base station whose level of service (e.g., Quality of Experience (QoE)) is impacted during a time corresponding to the detected interference, and generating information that associates the number of impacted user sessions at the base station with the interference detected at the base station. In some implementations, the prioritization engine 150 prioritizes each instance of detected interference according to the determined number of impacted user sessions. In some implementations, the prioritization engine 150 assigns interference instances with a larger number of impacted user sessions with a higher priority, as compared with interference instances having a lower number of impacted user sessions. In some implementations, the impacted user sessions are determined by using a machine learning system, by comparing QoE KPIs to related thresholds, or by performing any other suitable type of technique.

In one example, an operator maintains a network (e.g., a mobile communication network, a network for operating a video streaming service, etc.). The operator designates in an operator policy that downlink throughput (e.g., bandwidth for data that gets sent via a link to the user device) is the most important KPI for that operator, as it affects the users' quality of experience (QoE) more than any other KPI. Uplink throughput is also designated as important, since the operator's network receives packets from user devices with information on whether the user is watching or not and other information. Many inputs within the network could affect downlink throughput, e.g., interference, signal quality, device type, number of users, and cell configuration. Given all these conditions, the prioritization engine 150 builds a model that determines or receives from the operator measurements indicating what the downlink throughput is for a given user within the network, and then determines what condition or conditions most contributed to low downlink throughput or low speed indicated. The prioritization engine 150 then prioritizes these conditions in order of importance for resolving the low downlink throughput issue.

In some variations, the prioritization engine 150 utilizes one or more machine learning models to perform the prioritization. In some variations, the prioritization engine 150 builds a machine learning model of KPI metrics for an operator, including the KPI metrics for a given user device or group of user devices within the area. In some variations, the training set of data for the machine learning model can be telemetry data and/or KPI measurements collected or received by the interference analysis platform or system 100. In some variations, the training set of data can be one or a combination of historical data and current data. In some variations, the training set data expands as more data is collected and received from the operator and/or user devices within the area. In some variations, the machine learning employs uniform weights within a neural network. In some variations, operators can configure weights within the neural network based on what is important to the operator. For example, if an operator indicates that voice quality is more important relative to other KPIs, then higher weights are allocated to voice quality within the neural network.

In some variations, operators can have very important (VIP) users who may be premium value users, and the prioritization engine 150 can detect the impact of interference issues on KPIs device by device. The operator provides a custom device "A-list" or list of VIP user devices. The KPI performance regarding these VIP user devices can be considered of paramount importance, and weighted accordingly respectively to non-VIP user devices, even if those KPIs or metrics are considered low priority for other devices.

In some variations, the localization engine 160 functions to determine probable locations for the source of the interference. In some variations, the localization engine 160 includes an AoA (Angle of Arrival) estimator 161. In some variations, the localization engine 160 functions to receive several power levels of a single interference occurrence detected at each of a related receive antennas (e.g., antennas of a plurality of neighboring base stations), each power level identifying a power level of the interference occurrence received at one of the related antennas. For example, if an interference occurrence affects three neighboring base stations, the localization engine 160 receives at least one power level for each base station for the interference occurrence. If a base station includes several receive antennas, the localization engine 160 receives a power level for each receive antenna of each base station for the interference occurrence. In some implementations, the power level feature extractor 141 of the classification engine 140 determines a power level for an interference signature (e.g., 901, 902) extracted by the interference feature extractor 141, and the classification engine 140 provides the power levels determined by the power level feature extractor 141 to the localization engine 160. In some implementations, the power level feature extractor 141 performs a feature extraction process to determine the power levels of extracted interference signatures. In some implementations, the power level feature extractor 141 performs a machine learning process (as described herein) to determine the power levels of extracted interference signatures. In some embodiments, the power level feature extractor 141 includes at least one trained power level feature extraction model. In some implementations, the power level feature extractor 141 performs a statistical process to determine the power levels of extracted interference signatures. In some implementations, the power level feature extractor 141 performs a heuristic process to determine the power levels of extracted interference signatures.

In some implementations, the aggregator 143 identifies the related receive antennas (as described herein) and the classification system 140 uses an output of the aggregator to select the power levels (determined by the power level feature extractor 141) to send to the localization engine 160.

In some variations, the localization engine 160 functions to determine probable locations for the source of the interference by using the received power levels of the related receive antennas, and optionally at least one of telemetry data (as described herein), configuration information for at least one related receive antenna (accessed from the mobile network no), configuration information for at least one related base station (accessed from the mobile network no), extracted interference signatures received from the classification engine 140, radio frequency propagation characteristics of the related receive antennas, location information (absolute or relative) of the related receive antennas, geospatial data like human population, and building locations to generate these probable locations.

In some variations, the localization engine includes an AoA (Angle of Arrival) estimator 161 that determines at least an initial interference source probability for at least one geographic location, based on at least one of: received power levels of the related receive antennas, telemetry data (as described herein), configuration information for at least one related receive antenna (accessed from the mobile network 110), configuration information for at least one related base station (accessed from the mobile network 110), extracted interference signatures received from the classification engine 140, radio frequency propagation characteristics of the related receive antennas, location information (absolute or relative) of the related receive antennas, geospatial data like human population, building locations. In some variations, the localization engine 160 uses the generated interference signatures to generate the probable locations. In some implementations, each interference source probability identifies a probability of the interference source being located at the corresponding geographic location.

In some variations, the localization engine 160 generates a spatial heatmap that identifies each generated interference source probability. In some variations, the localization engine 160 generates a visual representation of a rank ordered set of polygons representing a closed geographical region for a probable interference source location for at least one generated interference source probability.

In some variations, the AoA estimator is implemented as a machine learning classifier, which predicts each potential interference source location with an assigned probability. The training set for the machine learning classifier can be any of the metrics listed above for generating the probable locations.

FIG. 3 illustrates an example of the spatial probability heatmap indicating probable locations of the interfering source. Different colors or shades correspond to different levels of probability for potential interference source locations. The bordered area designates the area affected by the interference.

Returning to FIG. 1, the output engine 170 sends the analysis output to at least one operator device (e.g., 180). In some variations, the analysis output includes output generated by at least one of the detection engine 130, the classification engine 140, the prioritization engine 150, the localization engine 160, and the output engine 170. In some variations, output engine 170 includes at least one of graphical user interface (GUI) system (e.g., 171) and an Application Programming Interface (API) system (e.g., 172). In some implementations, the output engine 170 sends the analysis output to at least one operator device (e.g., 180) via at least one of the GUI system (e.g., 171) and the API system (e.g., 172). In some variations, the one operator device 180 sends queries to the analysis datastore 120 via the output engine 170, and the analysis datastore 120 stores and maintains stored analysis output information. In some variations, the queries received by the output engine 170 from the operator device 180 (via at least one of the API and the GUI systems) include at least one of the time and/or spatial filters in which results are desired. In some variations, response to these queries includes the list of all the interference sources detected in the specified filters, along with their attributes, as illustrated in the example API description shown in FIG. 10. In some variations, the output engine 170 optionally determines and outputs one or more recommended corrective actions for mitigating the interference as part of the provided analysis output.

In some variations, GUI interface system 171 includes a an application server (e.g., a web application server the provides an application in accordance with a web protocol, e.g., HTTP). In a preferred embodiment, output engine 170 enables an administrator or operator of a mobile network (e.g., 110) to interact with and make requests of the intelligent interference analysis system 105, view the results of network interference analyses, and more. Additionally, or alternatively, the output engine 170 may function to transmit an interference analysis dashboard (e.g., via a user interface provided by the GUI system 171) to the operator device 180, and in some implementations the dashboard includes a timestamp of an interference event, a root cause of the event, and more.

Figure 4:
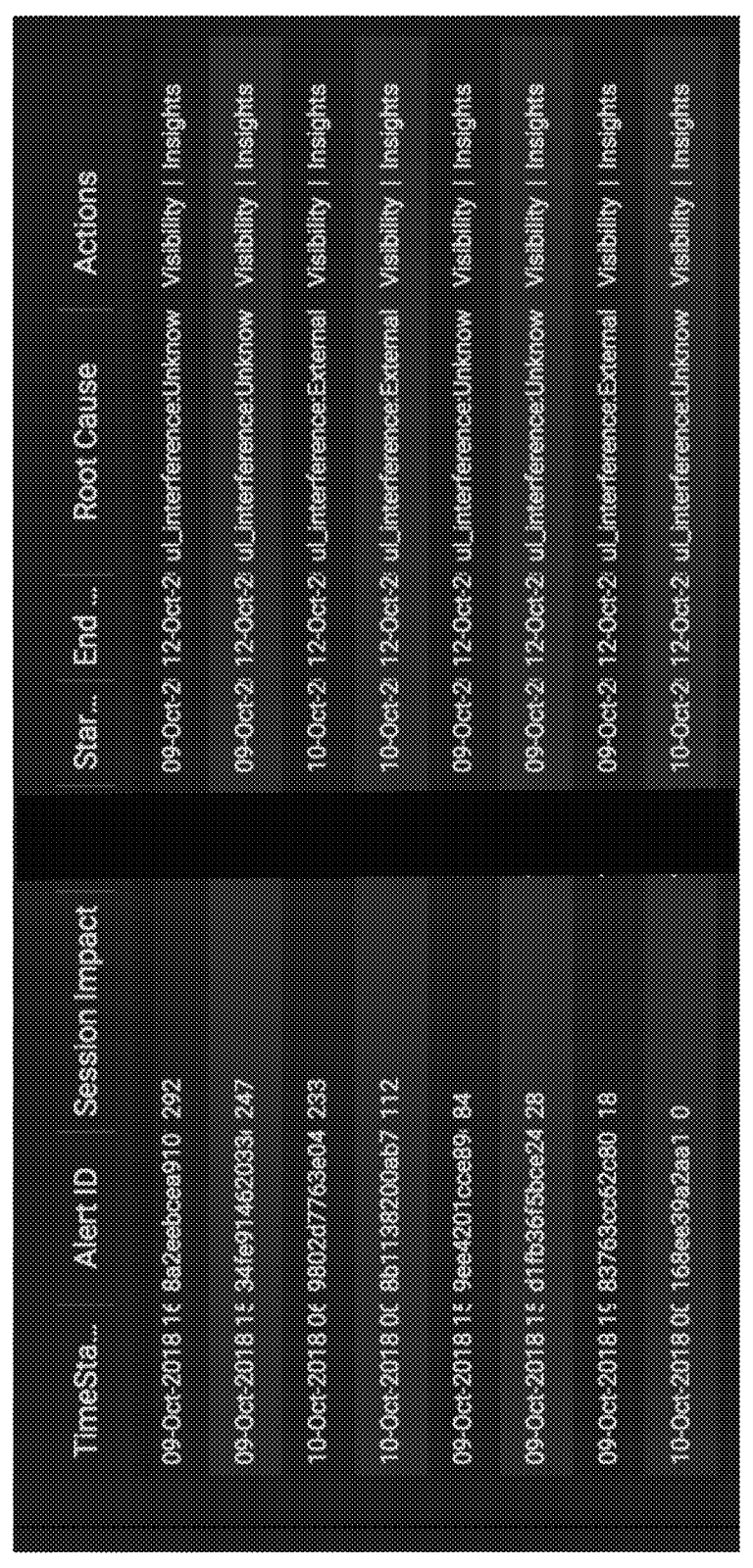

One example of such an interference analysis dashboard is illustrated in FIG. 4. A GUI dashboard is displayed for an operator at the operator device 180, with information regarding timestamps of interference events, unique alert identifiers for the events, an impact on the session for the user device, a start time and end time, a root cause or root causes for the event, and corrective actions for mitigating the interference taken and/or recommended.

In some variations, at least one component of the interference analysis system 105 (e.g., detection engine 130, classification engine 140, prioritization engine 150, datastore 120, localization engine 160, output engine 170, machine learning engine 190) functions to generate an interference information for the detected network interference. In some variations, the interference information identifies an interference signature (e.g., 901, 902), which is a portion of time-frequency characteristic data (e.g, 900 shown in FIG. 9). In some variations, the interference information further includes a spatial characteristic (e.g., an absolute location, relative location, etc.). In some variations, the system 100 uses the time-frequency characteristic data and other telemetry data (e.g, KPI information, location information, user equipment polling information, etc.) to generate the interference information. However, the interference information can include any suitable network performance indicator or metric. The system 100 can use location, time, frequency, network trace information, or other characteristics of infrastructure elements (e.g., 111a-c) within the mobile network to generate the interference information. In some variations, the infrastructure elements can include base stations, cell towers, and other elements of a mobile network infrastructure.

Returning to FIG. 1, one example embodiment of providing API calls and elements for exposing analysis output via the API system 172 shown in FIG. 10.

2. Method

Figure 5:
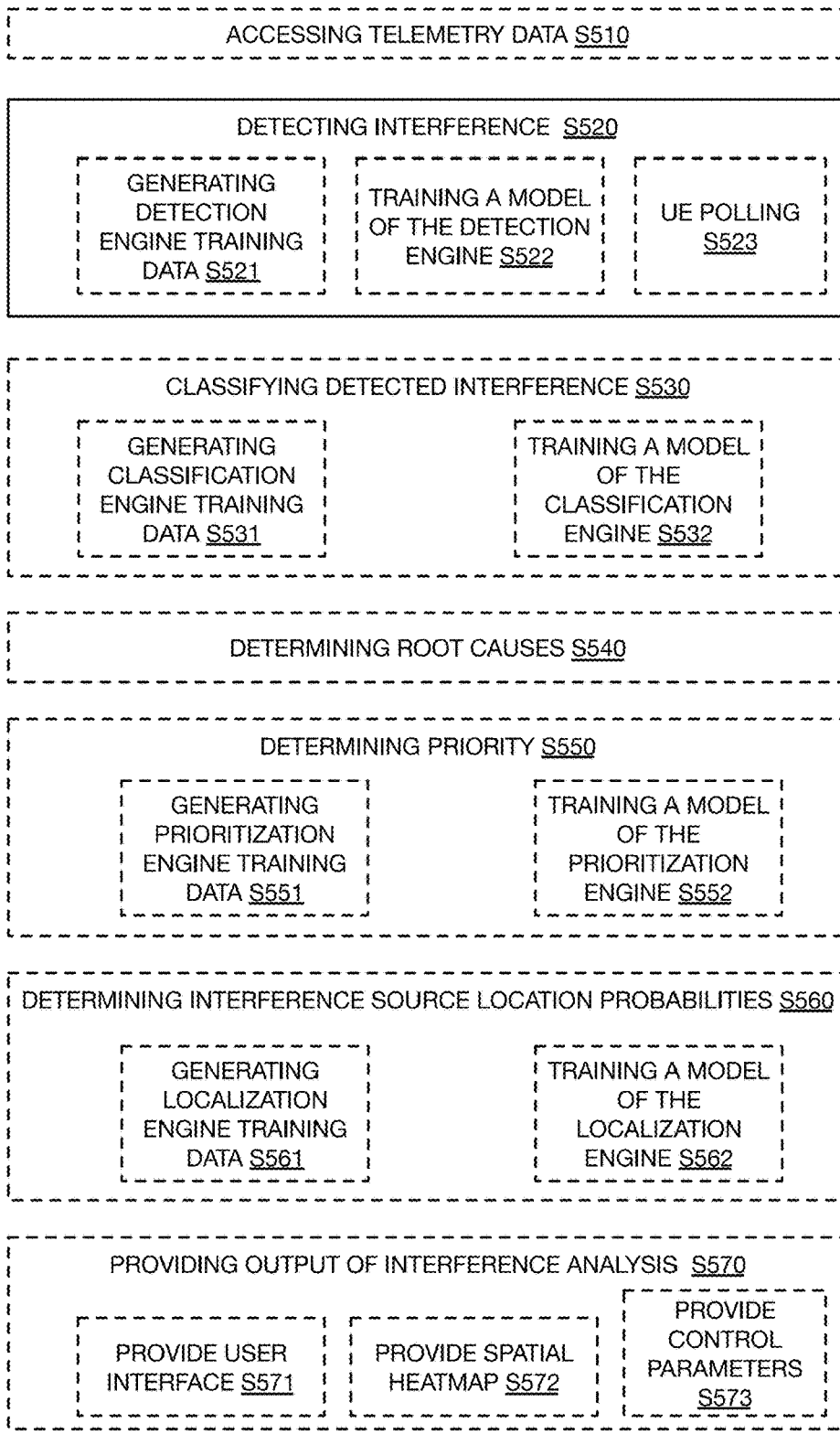
FIG. 5 illustrates a schematic representation of a method in accordance with one or more embodiments.

As shown in FIG. 5, a method 500 for providing intelligent analysis of mobile network interference includes: detecting interference within an area of the mobile network (e.g., no) S520. In some variations, the method 500 includes one or more of: accessing telemetry data of a mobile network S510; classifying detected interference S530; providing output of interference analysis S570; determining root causes S540; determining priority of detected interference S550; and determining interference source location probabilities S560. In some variations, S570 includes providing output of interference analysis to an operator device (e.g., 180). In some variations, S570 includes providing output of interference analysis to an infrastructure element (e.g., 111a-c) of the mobile network.

In some variations, the method 500 is enabled by a mobile networking service, network monitoring and/or control service, network security service, internet service provider, or any other network service. In a preferred embodiment, one or more aspects of the system may be enabled by a web-based software platform (e.g., the interference analysis platform) operable on a web server or distributed computing system.

In some variations, the method 500 is performed by at least one element of the system 100 shown in FIG. 1. In some variations, the interference analysis system 105 performs at least one process of the method 500. In some variations, an infrastructure element (e.g., 111a-c) performs at least one process of the method 500. In some variations, an operator device (e.g., 180) performs at least one process of the method 500.

S510 includes accessing telemetry data (e.g., the telemetry data described herein). In some variations, S510 includes the interference analysis system 105 receiving the telemetry data from the mobile network (e.g., 110) (e.g., from a storage device of the mobile network, an infrastructure element of the mobile network, etc.). In some variations, S510 includes the interference analysis system 105 storing received telemetry data at the analysis datastore 120. In some variations, S510 includes at least one component of the interference analysis system 105 (e.g., one of the components 130, 140, 150, 160, 170, 190) accessing the telemetry data from the analysis datastore 120.

In some variations, the interference analysis system 105 monitors the mobile network and collects telemetry data alternatively to or in addition to receiving telemetry data from the mobile network. In some variations, an operator of the mobile network sends telemetry data in some form to the interference analysis platform (e.g., by delivering a storage device that stores the telemetry data, sending an e-mail, uploading to a cloud storage system, or any other suitable process for sending data).

S520 includes detecting interference by using the telemetry data accessed at S510. S520 can include detecting interference within an area of the mobile network. S520 can include detecting interference at each of a plurality of base station receive antennas (e.g., 701-709) of the mobile network. In some variations, the interference is detected as described above with respect to the detection engine 130. In some variations, the interference is detected based on the received or collected telemetry data. In some variations, the detection engine 130 performs S520. In some variations, the detection engine 130 uses a trained interference detection model to detect interference. In some variations, the detection engine 130 performs a statistical analysis process to detect interference. In some variations, the detection engine 130 compares at least one KPI value to at least one threshold to detect interference.

S520 can include the detection engine 130 accessing the telemetry data from the datastore 120.

S520 can include S523. In some variations, S523 functions to access radio information from at least one user device (e.g., 201 shown in FIG. 200) that is communicatively coupled to the mobile network. At S520, detecting interference can include: detecting interference by using the radio information accessed at S523 and the time-frequency characteristic data accessed at S510. In some variations, S523 includes: upon detecting interference in a certain geographical area, polling a user device (e.g., 201 shown in FIG. 200) or group of user devices in the area (e.g., as shown in FIG. 2) to report measurements (e.g., radio information) related to their experienced interference levels (as described herein). In some variations, S520 includes detecting interference by using the telemetry data accessed at S510 and the polling responses (e.g., 220 shown in FIG. 2) received at S523. In some implementations, an infrastructure element (e.g., 111c) performs at least a portion of S523, and includes data included in polling responses in the telemetry data provided to the interference analysis system 105. In some implementations, the interference analysis system 105 performs at least a portion of S523.

In some variations, S520 includes detecting interference by using at least one interference detection model of the detection engine 130. In some implementations, at least one interference detection model is trained by using time-frequency characteristic data (e.g., 900) that is labeled with an "interference" label by comparing at least one KPI of the time-frequency characteristic data (e.g., 900) with a corresponding threshold for identifying interference. By virtue of using a trained model to detect interference from time-frequency characteristic data, rather than detecting interference by comparing KPI's to thresholds or performing statistical analysis by using KPIs, interference detection can be improved.

S520 can include training at least one interference detection model of the detection engine 130 by using labeled training data (S522). In some implementations, the detection engine 130 performs at least a portion of S522. In some implementations, the machine learning system 190 performs at least a portion of S522.

S520 can include generating labeled training data for training at least one interference detection model of the detection engine 130 (S521). In some implementations, the detection engine 130 performs at least a portion of S521. In some implementations, the machine learning system 190 performs at least a portion of S521.

In some variations, S521 includes: labeling at least a portion of the telemetry data as "interference". In some variations, S521 includes: labeling at least a portion of the time-frequency characteristic data included in the telemetry data as "interference". In some implementations, the labeling is performed by using at least one KPI (Key Performance Indicator). In some implementations, S521 includes accessing telemetry data that includes a set of time-frequency characteristic data (e.g., 900) for at least one receive antenna, identifying at least a first KPI associated with each time-frequency characteristic data, comparing the first KPI of each time-frequency characteristic data with at least one threshold, and labeling each time-frequency characteristic data based on a result of the respective comparison. In some variations, the first KPI is a network load KPI. In some variations, the first KPI is a noise level KPI. In some variations, the first KPI is an interference level KPI. In some variations, the first KPI is RSRQ. In some variations, the first KPI is an interference level KPI. In some variations, the first KPI is RSSI (Radio Signal Strength Indicator). In some implementations, if the first KPI for a time-frequency characteristic data (e.g., 900) is above the threshold, then the time-frequency characteristic data (e.g., 900) is labeled with an interference label, and the labeled time-frequency characteristic data (e.g., 900) is added to the labeled training data for the interference detection model of the detection engine 130.

S520 can include providing information identifying detected interference to the classification engine 140. In some implementations, the detection engine 130 provides to the classification engine the telemetry data associated with interference detected by the detection engine 130. In some implementations, the detection engine 130 provides to the classification engine information identifying telemetry data associated with interference detected by the detection engine 130. In some implementations, the information identifying telemetry data identifies a time and source (e.g., receive antenna, base station) (and optionally location) of each instance of detected interference.

S530 includes classifying interference detected at S530. S530 can include classifying each detected instance of interference by using time-frequency characteristics of the detected instance, as identified by the telemetry data. S530 can be performed as described above with respect to the classification engine 140. In some variations, the interference is classified based on the received or collected telemetry data. In some variations, the interference is classified based on session handoff information (as described herein). In some variations, the classification engine 140 performs S530. In some variations, the classification engine 140 uses at least one trained interference classification model to classify interference.

S530 can include using the interference signature feature extractor 142 to extract an interference signature (e.g., 901, 902) for each detected instance of interference from the time-frequency characteristics of the detected instance. In some variations, the interference signature feature extractor includes at least one feature extractor model that is trained by using time-frequency characteristic data (e.g., 900) (or portions of time-frequency characteristic data) that is labeled with an identifier of an interference signature.

In some variations, an interference signature can include at least a portion of a time characteristic and a frequency characteristic for the detected interference (e.g., as shown in FIG. 9). In some variations, an interference signature can further include a spatial characteristic (e.g., data associating the signature with a particular infrastructure element, absolute geographic location, relative geographic location, etc.).

S530 can include generating classification information for at least one extracted interference signature by using the classifier 144. In some variations, S530 includes the classifier 144 generating classification information for an extracted interference signature (e.g., 901, 902) for a receive antenna by using telemetry data of the receive antenna. In some variations, S530 includes the classifier 144 generating classification information for an extracted interference signature (e.g., 901, 902) for a receive antenna by using telemetry data of related receive antennas (as described herein). In some implementations, the classifier 144 uses an output of the aggregator 143 to identify telemetry data of related receive antennas (as described herein). Alternatively, or additionally, S530 can include classifying by using interference signatures of related receive antennas. In some implementations, the classifier 144 uses an output of the aggregator 143 to identify interference signatures of related receive antennas (as described herein). In some implementations, the classifier 144 uses an output of the aggregator 143 to identify interference signatures of related receive antennas by using session handoff information (as described herein).

In some implementations, the classifier 144 includes an "inherent network pattern" classifier that functions to determine whether an interference signature extracted by the signature feature extractor 142 identifies interference inherent in the mobile network. In some implementations, the "inherent network pattern" classifier includes a logistic regression model. In some variations, S530 includes using the "inherent network pattern" classifier to determine whether an extracted signature identifies interference inherent in the mobile network. In response to a determination, that the signature is not inherent in the network, an external interference classifier (included in the classifier 144) determines whether the signature identifies external interference (by using telemetry data of related receive antennas as identified by the aggregator 143).

S530 can include S532, which functions to train at least one model of the classification engine 140. In some implementations, the classification engine 140 performs at least a portion of S532. In some implementations, the machine learning system 190 performs at least a portion of S532. In some variations, S532 includes training at least one feature extractor model of the interference signature feature extractor 142 by using labeled training data. In some variations, S532 includes training at least one classification model of the classifer 144 by using labeled training data.

S530 can include S531, which functions to generate labeled training data for training at least one model of the classification engine 140. In some variations, S531 includes labeling portions of time-frequency characteristic data (e.g., 901, 902) that correspond to interference signatures. In some variations, S531 includes labeling portions of time-frequency characteristic data (e.g., 901, 902) that correspond to interference signatures of interference inherent in the mobile network.

S530 can include the classification engine 140 providing information identifying classifications of detected interference to output engine 170. In some implementations, the classification engine 140 provides to the output engine 170 at least a portion of the telemetry data associated with interference classified by the classification engine 140. In some implementations, the classification engine 140 provides to the output engine 170 information identifying telemetry data associated with interference classified by the classification engine 140. In some implementations, the information identifying telemetry data identifies a time and source (e.g., receive antenna, base station) (and optionally location) of each instance of classified interference.

S540 optionally includes determining one or more root causes for the interference. The root cause(s) are determined as described above with respect to the classification engine 140. In some variations, the classification engine 140 performs S540.

S550 optionally includes determine a prioritization of detected interference with respect to service degradation of subscribers. In some variations, at least a portion of S550 is performed by the prioritization engine 150. In some variations, at least a portion of S550 is performed by the output engine 170. In some variations, determination of a prioritization of detected interference is performed as described above with respect to the prioritization engine 150. In some variations, service degradation is determined according to one or more key performance indicators (KPI) or service-level metrics within the mobile network. In some variations, such KPIs or metrics can be received from the operator, mobile network, or a user device, or collected or determined by the interference analysis platform.

S550 can include the prioritization engine 150 determining for each base station of the mobile network, a number of user sessions whose level of service (e.g., Quality of Experience (QoE)) is impacted, for a plurality of points or periods of time. S550 can include accessing telemetry data for each classified instance of interference (e.g., from the classification engine 140), accessing telemetry data of each classified instance of interference instance (e.g., from the datastore 120), and accessing information identifying impacted user session counts for each base station (e.g., from the prioritization engine). Base stations associated with each classified instance of interference are identified. In an example, base station identification information included in the telemetry data used to classify the an instance of interference is associated with the classified instance of interference, and an impacted user session count for the identified base station is associated with the classified instance of interference. Each classified instance of interference is prioritized in accordance with the associated impacted user session count.

In some variations, the prioritization engine uses a trained machine learning model to identify user sessions whose service is impacted. In some variations, the trained model predicts an expected QoS for a user session based on the telemetry data. S550 can include S552, which functions to train a model of the prioritization engine 150. S550 can include S551, which functions to generate training data used to train a model of the prioritization engine 150.

S560 optionally includes determining probable locations for the source of the interference. In some variations, this determination includes calculating one or more interference location probabilities within the area of the mobile network. The probable locations are determined as described above with respect to the localization engine 160. In some variations, the localization engine 160 performs at least a portion of S560. In some variations, the classification engine 140 performs at least a portion of S560. In some variations, the power level feature extractor 141 performs at least a portion of S560. In some variations, the AoA estimator 161 performs at least a portion of S560.

S560 can include S562, which functions to train a model (e.g., a model of the AoA estimator 161) of the localization engine 160. S560 can include S561, which functions to generate training data used to train a model (e.g., a model of the AoA estimator 161) of the localization engine 160.

S570 includes providing an output of interference analysis (e.g., to the operator device, to an infrastructure element, e.g., 111*a-c*), as described herein. In some variations, the output is provided via a GUI (e.g., 171), such as a dashboard for the operator, or API (e.g., 172) which allows an operator of the operator device 180 to develop applications or otherwise use the results of queries of the analysis output. In some variations, the output engine 170 optionally determines and outputs one or more recommended corrective actions for mitigating the interference as part of the provided analysis output. In some variations, the output of interference analysis includes at least one of: at least a portion of the telemetry data; an output of the classification engine; an output of the detection engine, an output of the localization engine, an output of the prioritization engine, and data generated by the output engine 170.

S570 can include S571, which functions to generate a user interface and provide the user interface to the operator device 180. In some variations, the user interface includes user interface elements constructed to receive user input from the operator device, and display output of interference analysis based on the received user input. In some variations, user input includes selection of at least one of: a start and end time during which to perform interference analysis, a QoE impact threshold used to filter and/or prioritize classified instances of detected interference, and a mobile network base station for which the interference analysis is to be performed.

S570 can include S572, which functions to generate a spatial heatmap (as described herein) and provide the spatial heatmap to the operator device. In some variations, S570 includes generating a user interface that includes a visual representation of a rank ordered set of polygons representing a closed geographical region for a probable interference source location, and providing the user interface to the operator device. In some variations, S572 includes generating a user interface that includes a visual representation of a rank ordered set of polygons representing a closed geographical region for a probable interference source location, and providing the user interface to the operator device.

S570 can include S573, which functions to generate control parameters for at least one infrastructure element. In some implementations, the control parameters are generated to reduce impact of interference. In some variations, S573 includes providing the control parameters to the operator device. In some variations, S573 includes providing the control parameters to an infrastructure element of the mobile network. In some implementations, the infrastructure element processes the received control parameters, which controls at least one infrastructure element of the mobile network to change operation to reduce impact of interference. Control parameters can include any suitable type of control parameters, that when processed by the mobile network, control the mobile network to change operation to reduce impact of interference. In some implementations, control parameters can include radio transmitter power level parameters. In a first example, if external interference is impacting a base station, the base station's radio transmission power level is increased. In a second example, if internal interference (caused by an infrastructure element) is impacting a base station, the infrastructure element causing the interference can be reconfigured to reduce the impact of the interference.

In some variations, S570 includes the output engine 170 automatically controlling at least one infrastructure element to reduce impact of detected interference based on the output of interference analysis.

Figure 6:
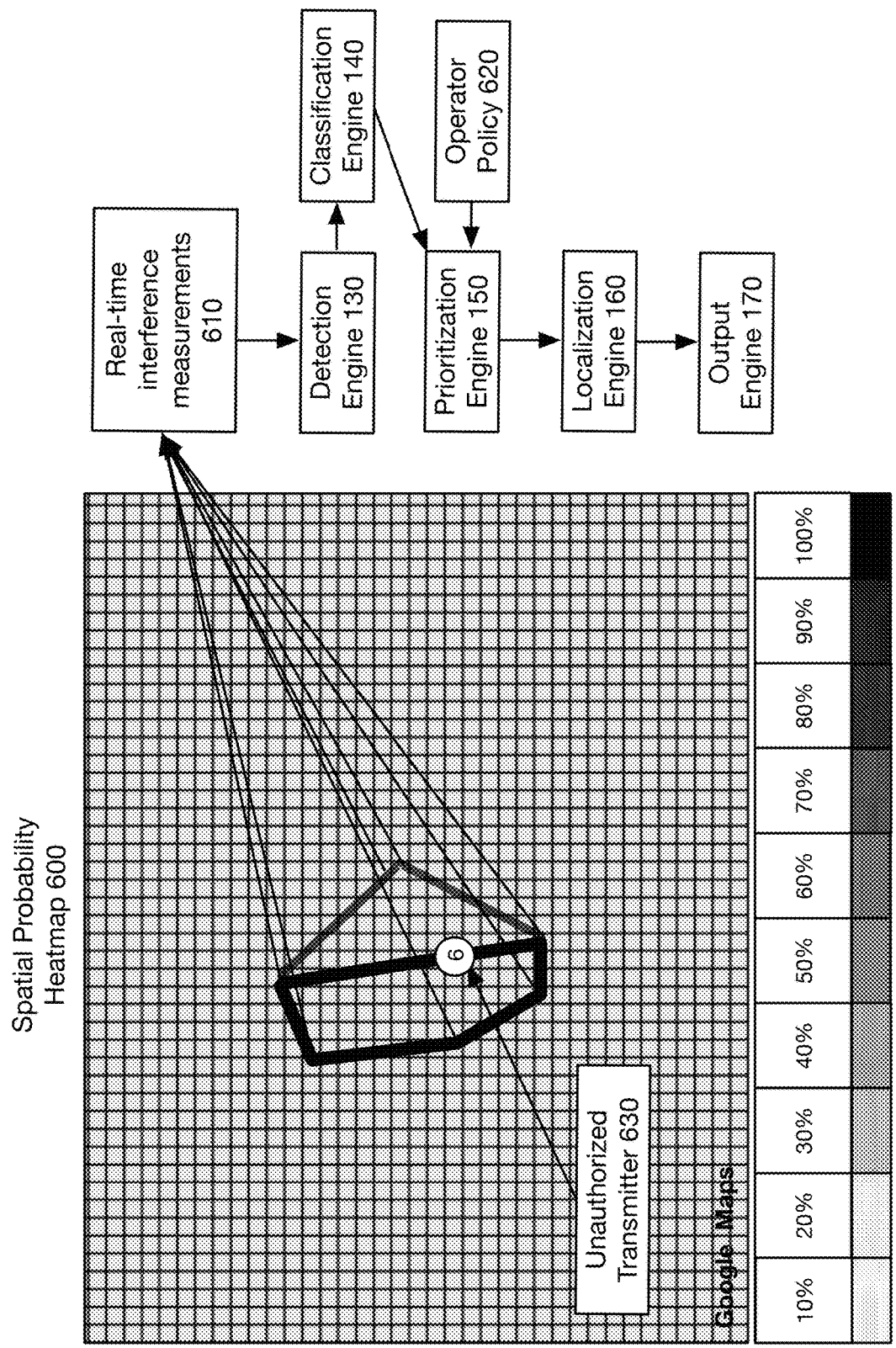
FIG. 6 illustrates a schematic representation in accordance with one or more embodiments.

FIG. 6 is a schematic representation in accordance with one or more embodiments of the present application. A spatial probability heatmap 600 is provided as analysis output to an operator of a mobile network. Real-time interference measurements 610 are collected from one or more cell towers and/or affected base stations as telemetry data. The detection engine 130 then detects interference based on the collected real-time interference measurements 610 and sends the detected interference information to the classification engine 140. The classification engine 140 classifies the detected interference, then sends information of classified instances of interference to the prioritization engine 150. An operator policy 620 includes KPIs related to important service-level metrics that the operator considers critical for users of the network. The prioritization engine 150 receives the operator policy, and prioritizes the classified instances of interference based on the KPIs. A localization engine 160 determines probabilities of probable locations of the source of the interference, unauthorized transmitter 630. The spatial probability heatmap 600 is then sent to a device associated with the operator via output engine 170.

In some variations, the interference analysis system 105 is implemented as a single hardware device. In some variations, the interference analysis system 105 is implemented as a plurality of hardware devices.

In some variations, the interference analysis system 105 includes a bus 1101 that interfaces with the processors, the main memory 1122 (e.g., a random access memory (RAM)), a read only memory (ROM) 1104, a processor-readable storage medium 1105, and a network device 1111. In some embodiments, bus 1101 interfaces with at least one of a display device and a user input device.

In some variations, the processors 1103A-1103N include one or more of an ARM processor, an X86 processor, a GPU (Graphics Processing Unit), a tensor processing unit (TPU), and the like. In some variations, at least one of the processors includes at least one arithmetic logic unit (ALU) that supports a SIMD (Single Instruction Multiple Data) system that provides native support for multiply and accumulate operations.

In some variations, at least one of a central processing unit (processor), a GPU, and a multi-processor unit (MPU) is included.

In some variations, the processors and the main memory form a processing unit 1199. In some variations, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some variations, the processing unit includes at least one arithmetic logic unit (ALU) that supports a SIMD (Single Instruction Multiple Data) system that provides native support for multiply and accumulate operations. In some variations the processing unit is a Central Processing Unit such as an Intel processor.

The network adapter device 1111 provides one or more wired or wireless interfaces for exchanging data and commands. In some variations, the system 105 is communicatively coupled to at least an infrastructure element via the network device 1111. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some variations, the processor-readable storage medium 1105 of the system 105 includes the accessed telemetry data and machine-executable instructions (and related data) for an operating system 1130, software programs 1113, and device drivers 1114. In some variations, the processor-readable storage medium 1105 includes machine-executable instructions (and related data) that, when executed by a processor of the system 105, control the system 105 to perform the method 500.

In some variations, the processor-readable storage medium 1105 includes machine-executable instructions (and related data) for at least one of the detection engine 130, classification engine 140, the prioritization engine 150, the localization engine 160, and the output engine 170, and optionally includes one or more of training data (e.g., labeled training data) and a trained machine learning model for at least one component of the system 105.

The method of the preferred embodiment and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method performed by an interference analysis system, the method comprising:
   accessing mobile network telemetry data generated by at least one infrastructure element of a mobile network, the telemetry data including at least time-frequency characteristic data for each of a plurality of base stations of the mobile network;
   training, by applying machine learning to at least a portion of the telemetry data as training data, an interference detection model that detects interference from a set of the time-frequency characteristic data, wherein training the interference detection model includes applying different weights to different portions of the training data based on at least one key performance indicator (KPI) associated with the different portions of the training data;
   with the trained interference detection model, detecting interference of at least one base station by using at least the accessed time-frequency characteristic data;
   comparing the detected interference to a threshold;
   based on the detected interference surpassing the threshold, generating a control parameter; and
   providing the control parameter to at least one of the operator device or the at least one infrastructure element,
   wherein the at least one of the operator device or the at least one infrastructure element implements a change based on the control parameter for reducing the detected interference.

2. The method of claim 1, wherein the at least one infrastructure element includes a base station, and wherein the control parameter causes the base station to increase a radio transmission power level.

3. The method of claim 1, further comprising generating a spatial heatmap that is displayed on a user interface of the operator device.

4. The method of claim 3, wherein the spatial heatmap comprises a visual representation of a rank ordered set of polygons representing a closed geographical region for a probable interference source location.

5. The method of claim 3, wherein the spatial heatmap comprises different colors corresponding to different levels of probability for potential interference source locations.

6. The method of claim 1, further comprising generating an interference analysis dashboard that is displayed on a user interface of the operator device, wherein the interference analysis dashboard comprises at least one of: information regarding timestamps of interference events, unique alert identifiers to the events, an impact on the session for the user device, a start time and end time of interference, a root cause for the event, and corrective actions for mitigating the interference.

7. The method of claim 1, further comprising, with a trained Angle of Arrival ("AoA") estimator, determining an interference source probability for at least one geographic location by using at least the power levels determined by a power level feature extractor.

8. A system comprising:
   an interference analysis system communicatively coupled to at least one of a plurality of mobile network infrastructure elements; and
   an operator device communicatively coupled to the interference analysis system,
   wherein the interference analysis system is configured to:
      access mobile network telemetry data generated by at least one of the plurality of mobile network infrastructure elements, the telemetry data including at least time-frequency characteristic data for each of a plurality of base stations of the mobile network;
      train, by applying machine learning to at least a portion of the telemetry data as training data, an interference detection model that detects interference from a set of the time-frequency characteristic data, wherein training the interference detection model includes applying different weights to different portions of the training data based on at least one key performance indicator (KPI) associated with the different portions of the training data;
      with the trained interference detection model, detecting interference of at least one base station by using at least the accessed time-frequency characteristic data;
      compare the detected interference to a threshold;
      based on the detected interference surpassing the threshold, generate; and
      provide the control parameter to at least one of the operator device or the at least one of the plurality of mobile network infrastructure elements,
      wherein the at least one of the operator device or the at least one of the plurality of mobile network infrastructure elements implements a change based on the control parameter for reducing the detected interference.

9. The system of claim 8, wherein the at least one of the plurality of mobile network infrastructure elements includes a base station, and wherein the control parameter causes the base station to increase a radio transmission power level.

10. The system of claim 8, wherein the interference analysis system further generates a spatial heatmap that is displayed on a user interface of the operator device.

11. The system of claim 10, wherein the spatial heatmap comprises a visual representation of a rank ordered set of polygons representing a closed geographical region for a probable interference source location.

12. The system of claim 10, wherein the spatial heatmap comprises different colors corresponding to different levels of probability for potential interference source locations.

13. The system of claim 8, wherein the interference analysis system further generates an interference analysis dashboard that is displayed on a user interface of the operator device, wherein the interference analysis dashboard comprises at least one of: information regarding timestamps of interference events, unique alert identifiers to the events, an impact on the session for the user device, a start time and end time of interference, a root cause for the event, and corrective actions for mitigating the interference.

14. The system of claim 8, wherein the interference analysis system further comprises a trained Angle of Arrival ("AoA") estimator that determines an interference source probability for at least one geographic location by using at least the power levels determined by a power level feature extractor.

15. A non-transitory, computer-readable medium comprising instructions that, when executed by an interference analysis system having a hardware processor and memory store, cause the interference analysis system to perform stages comprising:
accessing mobile network telemetry data generated by at least one infrastructure element of a mobile network, the telemetry data including at least time-frequency characteristic data for each of a plurality of base stations of the mobile network;
training, by applying machine learning to at least a portion of the telemetry data as training data, an interference detection model that detects interference from a set of the time-frequency characteristic data, wherein training the interference detection model includes applying different weights to different portions of the training data based on at least one key performance indicator (KPI) associated with the different portions of the training data;
with the trained interference detection model, detecting interference of at least one base station by using at least the accessed time-frequency characteristic data;
comparing the detected interference to a threshold;
based on the detected interference surpassing the threshold, generating a control parameter; and
providing the control parameter to at least one of the operator device or the at least one infrastructure element,
wherein the at least one of the operator device or the at least one infrastructure element implements a change based on the control parameter for reducing the detected interference.

16. The non-transitory, computer-readable medium of claim 15, wherein the at least one infrastructure element includes a base station, and wherein the control parameter causes the base station to increase a radio transmission power level.

17. The non-transitory, computer-readable medium of claim 15, the stages further comprising generating a spatial heatmap that is displayed on a user interface of the operator device.

18. The non-transitory, computer-readable medium of claim 17, wherein the spatial heatmap comprises a visual representation of a rank ordered set of polygons representing a closed geographical region for a probable interference source location.

19. The non-transitory, computer-readable medium of claim 17, wherein the spatial heatmap comprises different colors corresponding to different levels of probability for potential interference source locations.

20. The non-transitory, computer-readable medium of claim 15, the stages further comprising generating an interference analysis dashboard that is displayed on a user interface of the operator device, wherein the interference analysis dashboard comprises at least one of: information regarding timestamps of interference events, unique alert identifiers to the events, an impact on the session for the user device, a start time and end time of interference, a root cause for the event, and corrective actions for mitigating the interference.

21. The method of claim 1, wherein training the interference detection model includes applying a first weight to a first portion of the training data associated with downlink throughput and a second weight, different from the first weight, to a second portion of the training data associated with a rate of dropped calls.

22. The method of claim 1, wherein training the interference detection model includes applying a first weight to a first portion of the training data associated with voice quality and a second weight, different from the first weight, to a second portion of the training data associated with network accessibility.

23. The system of claim 8, wherein training the interference detection model includes applying a first weight to a first portion of the training data associated with downlink throughput and a second weight, different from the first weight, to a second portion of the training data associated with a rate of dropped calls.

24. The system of claim 8, wherein training the interference detection model includes applying a first weight to a first portion of the training data associated with voice quality and a second weight, different from the first weight, to a second portion of the training data associated with network accessibility.

25. The non-transitory, computer-readable medium of claim 15, wherein training the interference detection model includes applying a first weight to a first portion of the training data associated with downlink throughput and a second weight, different from the first weight, to a second portion of the training data associated with a rate of dropped calls.

26. The non-transitory, computer-readable medium of claim 15, wherein training the interference detection model includes applying a first weight to a first portion of the training data associated with voice quality and a second weight, different from the first weight, to a second portion of the training data associated with network accessibility.

* * * * *